(12) United States Patent
Bergman et al.

(10) Patent No.: US 7,634,151 B2
(45) Date of Patent: Dec. 15, 2009

(54) IMAGING SYSTEMS, ARTICLES OF MANUFACTURE, AND IMAGING METHODS

(75) Inventors: Ruth Bergman, Palo Alto, CA (US); Hila Nachlieli, Palo Alto, CA (US); Gitit Ruckenstein, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 587 days.

(21) Appl. No.: 11/166,877

(22) Filed: Jun. 23, 2005

(65) Prior Publication Data

US 2006/0290794 A1 Dec. 28, 2006

(51) Int. Cl.
*G06K 9/00* (2006.01)
*G06K 9/40* (2006.01)

(52) U.S. Cl. .................................. 382/274; 382/149
(58) Field of Classification Search ................ 382/145, 382/149, 274, 275, 162, 305, 312; 345/589, 345/604, 611; 346/246
See application file for complete search history.

(56) References Cited

U.S. PATENT DOCUMENTS

| | | | | |
|---|---|---|---|---|
| 6,529,622 | B1 * | 3/2003 | Pourjavid | 382/149 |
| 6,625,318 | B1 * | 9/2003 | Tan et al. | 382/224 |
| 6,813,062 | B2 * | 11/2004 | Sandstrom | 359/292 |
| 7,065,239 | B2 * | 6/2006 | Maayah et al. | 382/145 |
| 2003/0039402 | A1 * | 2/2003 | Robins et al. | 382/275 |
| 2003/0068096 | A1 | 4/2003 | Dupont et al. | |
| 2004/0161153 | A1 | 8/2004 | Lindenbaum | |
| 2006/0158703 | A1 | 7/2006 | Kisilev et al. | |

OTHER PUBLICATIONS

"Markov random field texture models"; Cross et al.; IEEE Transactions PAMI, 5:25-39, 1980; 184 pp.
Adobe Photoshop; http://www.computer-darkroom.com/tutorials/tutorial_5_1.htm; Mar. 1, 2005; 6 pp.
"Texture Mixing and Texture Movie Synthesis using Statistical Learning"; Bar-Joseph et al.; IEEE Transactions on Visualization and Computer Graphics, 7(2); 2001; pp. 1-28.
"Image Inpainting"; Bertalmo et al.; Proceedings of Siggraph 2000; Jul. 2000; pp. 1-8.
"Simultaneous structure and texture image inpainting"; Bertalmo et al.; Image Processing, IEEE Transactions on, vol. 12 Issue: 8 ; Aug. 2003; pp. 882-889.
"Texture synthesis using gray-level co-occurrence models: algorithms, experimental analysis, and psychophysical support"; Copeland et al.; Opt. Eng. 0(11); Nov. 2001; 6 pp.

(Continued)

*Primary Examiner*—Kanji Patel

(57) ABSTRACT

Imaging systems, articles of manufacture, and imaging methods are described according to aspects of the disclosure. According to one embodiment, an imaging system includes processing circuitry configured to access image data of a plurality of pixels of an image, to provide a plurality of representations of the image data, to determine contrast difference between the representations of the image data for a respective one of the pixels, to identify the one of the pixels as being defective using the determined contrast difference, and to provide replacement image data for the one of the pixels identified as defective and which is different than the accessed image data for the one of the pixels identified as defective.

39 Claims, 5 Drawing Sheets

OTHER PUBLICATIONS

"Object Removal by Exemplar-Based Inpainting"; Criminisi et al.; In Proc. IEEE CVPR 2003, Madison, WI; Jun. 2003; pp. 1-8.

"Markov randoim field texture models"; Cross et al.; IEEE Transactions PAMI, 5:25-39, 1983.

"Multiresolution sampling procedure for analysis and synthesis of texture images"; De Bonet et al.; Proc. of ACM Siggraph; Jul. 1997; 8 pp.

"A non-parametric multi-scale statistical model for natural images"; De Bonet et al.; In Adv in Neural Info Processing, vol. 9. MIT Press; Dec. 1997; 8 pp.

"Digital Ice"; Eastman Kodak Company; http://www.asf.com/products/ice/FilmICEOverview.shtml; 2001; 2 pp.

"Modeling and rendering of weathered stone"; Dorsey et al.; Proceedings of Siggraph 99; Aug. 1999; pp. 225-234.

"Image quilting for texture synthesis and transfer"; Efros et al.; Proceedings of Siggraph 2001; Aug. 2001; pp. 341-346.

"Texture Synthesis by Non-parametric Sampling"; Efros et al.; Proceedings of IEEE Internation Conference on Computer Vision; Corfu, Greece; Sep. 1999; pp. 2665-2673.

"The Elements of Statistical Learning—Data Mining, Inference, and Prediction"; Hastie et al.; Springer-Velag; 2001; pp. 79-95.

"Pyramid based texture analysis/synthesis"; Heeger et al.; Proceedings of SIG Graph 1995; Jul. 1995; pp. 229-238.

"A parametric texture model based on joint statistics of complex wavelet coefficients"; Portilla et al.; Intl. Journal of Computer Vision, vol. 40, Is. 1; Dec. 2000; pp. 49-71.

"Combining frequency and spatial domain information for fast interactive image noise removal"; Hirani et al.; In Proceedings of ACM Siggraph; 1996; pp. 269-276.

"Polynomial Texture Maps"; Malzbender et al.; Proceedings of SIC-Graph 2001; Aug. 2001; pp. 519-528.

"Image quality assessment: From error visibility to structural similarity"; Wang et al.; IEEE Trans. Image Processing, 13(4):600-612; Apr 2004.

"Fast Texture Synthesis using Tree-structured Vector Quantization"; Wei et al.; In Proceedings of SIC Graph 2000; 2000; 10 pp.

"A Computational Framework for Segmentation and Grouping"; Medioni et al.; http://www.elsevier.com/inca/publications/store/6/2/0/7/3/1/index.htm; 2004; 3 pp.

"A Context Sensitive Texture Nib"; Malzbender et al.; Proc. of Computer Graphics International; Jun. 1993; pp. 151-163.

"Polaroid Dust & Scratch Utility"; http://www.polaroid.com/service/software/poladsr/poladsr.html; Mar. 2005; 1 pp.

* cited by examiner

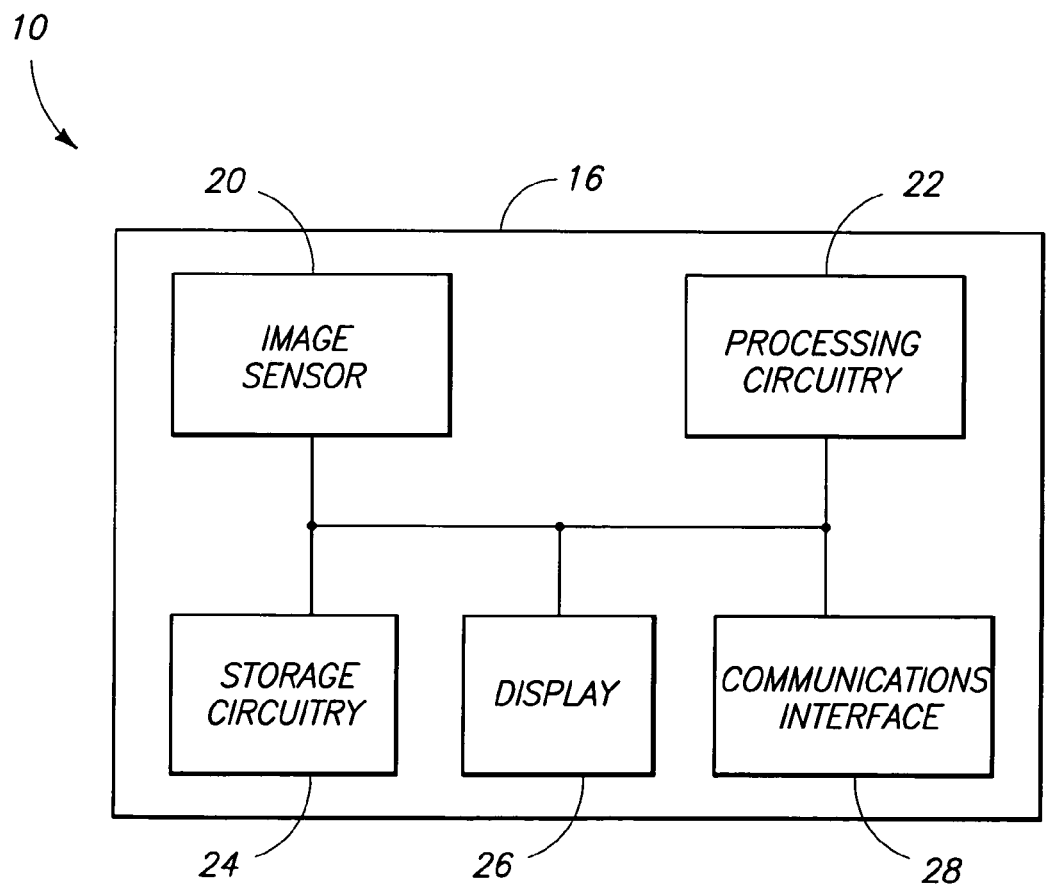

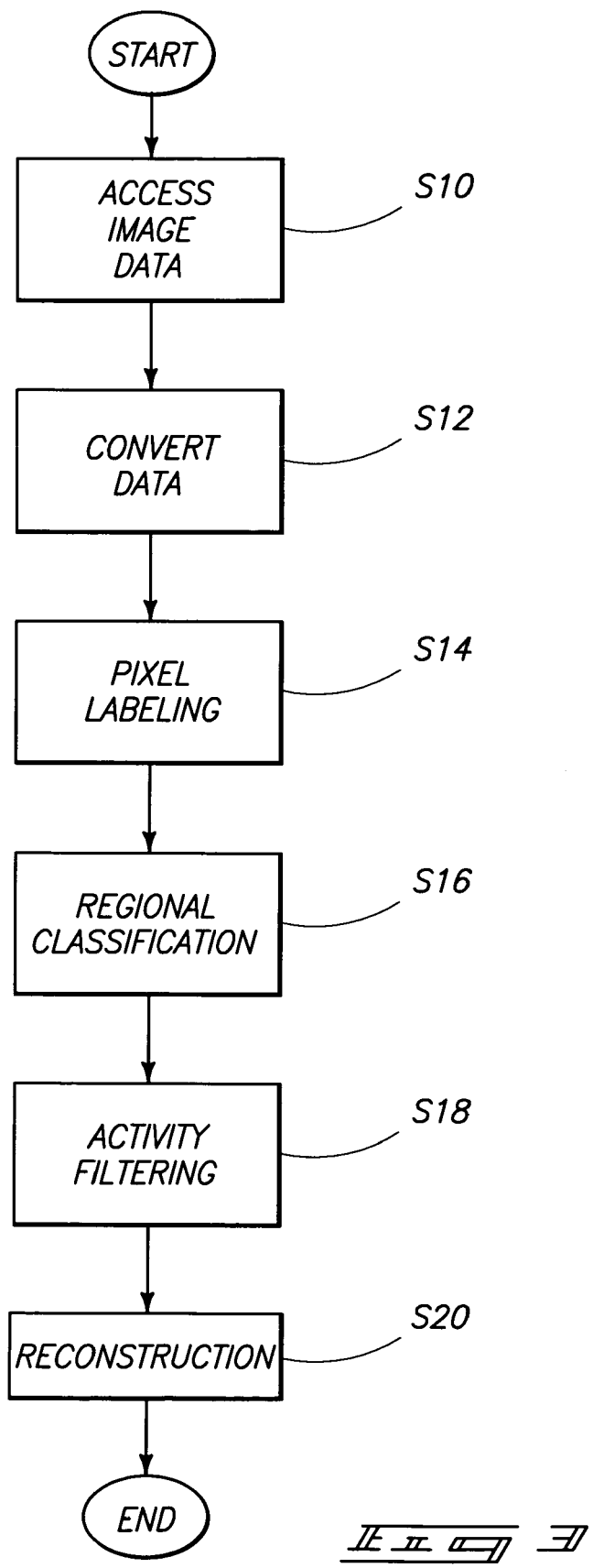

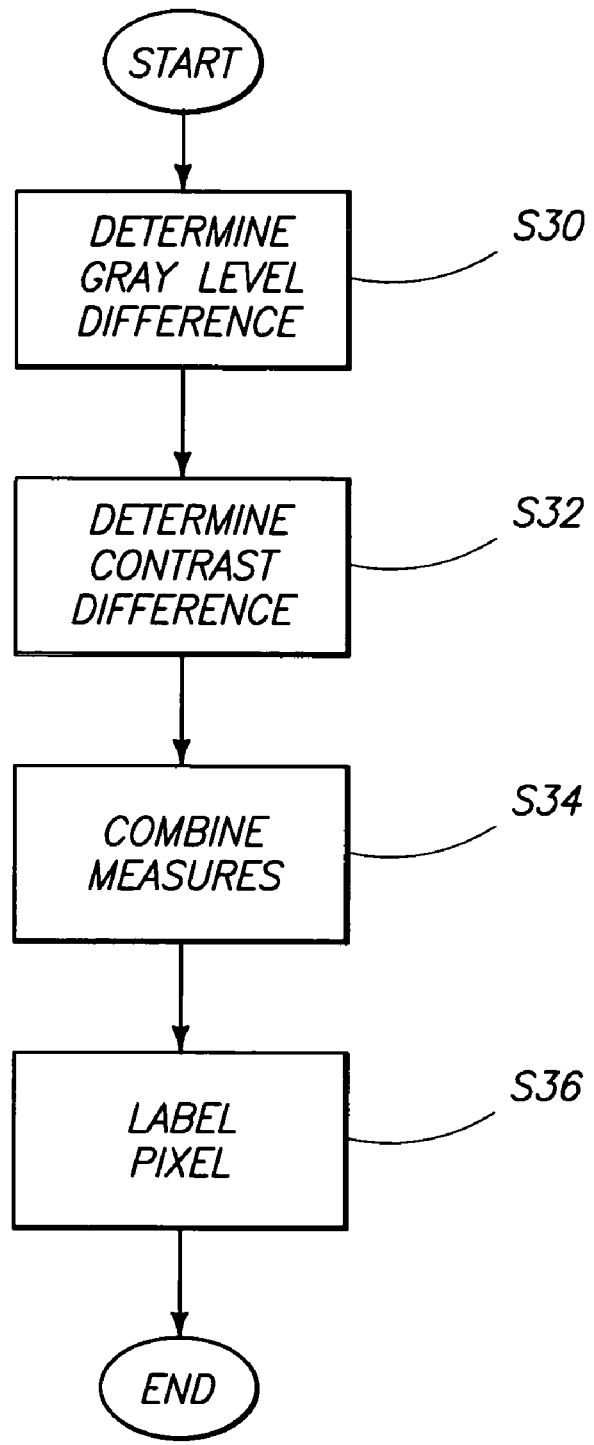

US 7,634,151 B2

IMAGING SYSTEMS, ARTICLES OF MANUFACTURE, AND IMAGING METHODS

FIELD OF THE DISCLOSURE

Aspects of the disclosure relate to imaging systems, articles of manufacture, and imaging methods.

BACKGROUND OF THE DISCLOSURE

Imaging systems of various designs have been used extensively for generating images. Exemplary imaging systems include copiers, scanners, cameras, and more recently digital cameras, and other devices capable of generating images. The devices may create digital image data which may be stored, displayed, and modified by a user.

It is not uncommon for image data of images to have light or dark artifacts which were generated during the creation of the image data. For example, dust, scratches, hair, etc. on prints, slides, or negatives being scanned by a scanner may distinctly appear as artifacts distinguishable from features of the images. These unsightly defects are of increasing concern especially with the improved optics and imaging systems providing images of increased color accuracy and resolution. Further, film photographs may be scanned to provide the film images in digital form and the scanned images may be enlarged for viewing using a monitor or projector or as a hard image. The process of enlarging makes small dust specks and scratches very apparent.

At least some aspects of the disclosure are directed towards providing improved imaging systems and apparatus which reduce the presence of defects in images.

SUMMARY

According to some aspects, exemplary imaging systems, articles of manufacture, and imaging methods are described.

According to one embodiment, an imaging system comprises processing means for accessing image data of a plurality of pixels of an image and for identifying at least one of the pixels as being defective, and wherein the processing means further comprises, responsive to the identification, means for identifying a block of pixels, for determining gradient information using the block of pixels, for determining a direction of a local edge using the gradient information, for determining replacement image data using image data of pixels in the direction of the local edge, and for associating the replacement image data with the at least one defective pixel.

According to another embodiment, an imaging method comprises accessing image data of a plurality of pixels of an image, wherein at least one of the pixels is identified as being defective, and reconstructing the at least one defective pixel comprising identifying a first block of pixels, analyzing a plurality of second blocks of pixels with respect to the first block of pixels, responsive to the analysis, selecting one of the second block of pixels as replacement image data, and associating the replacement image data with the at least one defective pixel.

Other embodiments are described as is apparent from the following discussion.

DESCRIPTION OF THE DRAWINGS

FIG. 1 is a functional block diagram of an imaging system according to one embodiment.

FIG. 2 is a functional block diagram of exemplary components of an imaging system according to one embodiment.

FIG. 3 is a flow chart of a method for processing image data according to one embodiment.

FIG. 4 is a flow chart of a method for identifying defective pixels of image data according to one embodiment.

DETAILED DESCRIPTION

Figure 5:
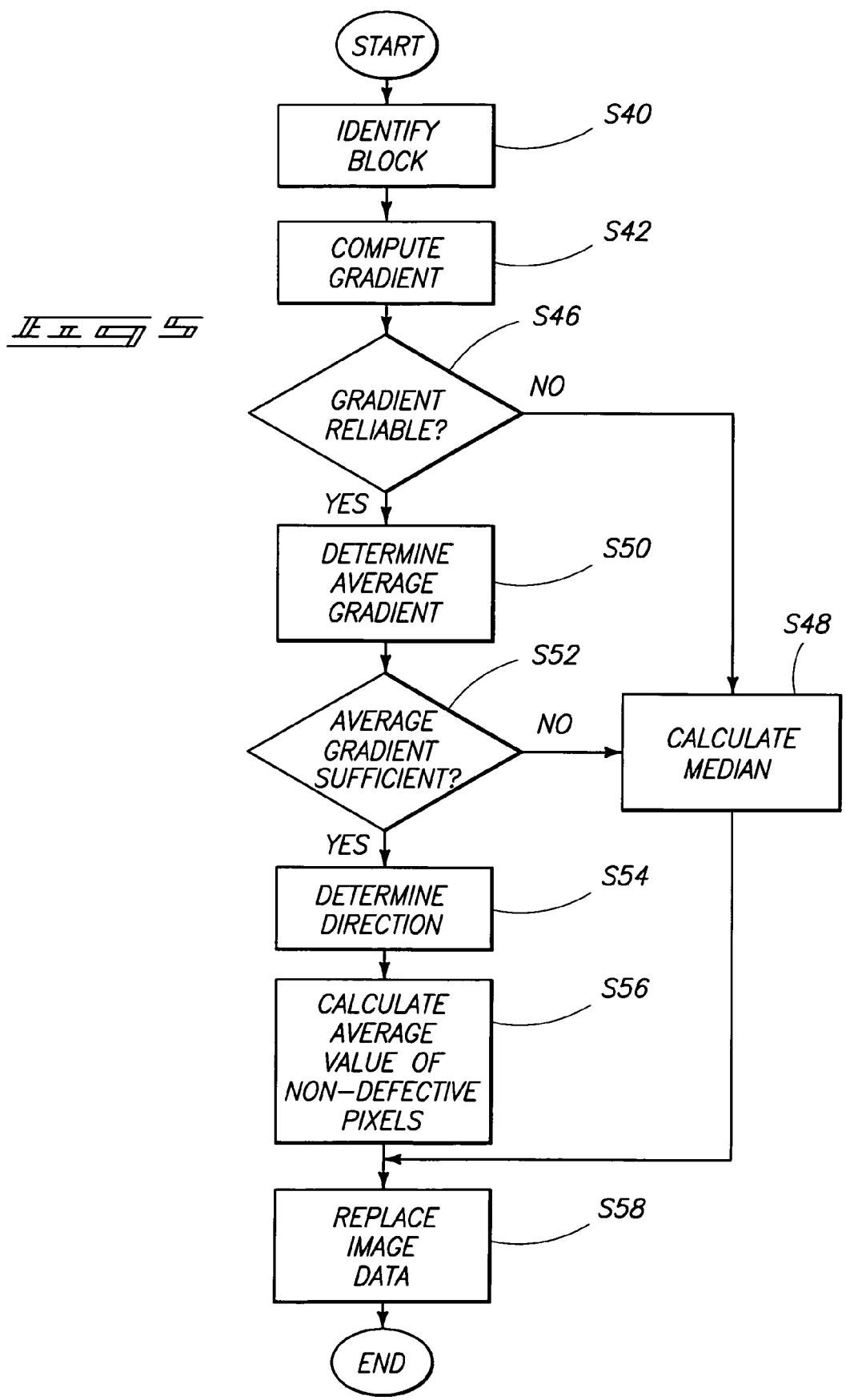
FIG. 5 is a flow chart of a method for reconstructing defective pixels according to one embodiment.

At least some aspects of the disclosure are related to correction of defects within data of an image. Defects may result from the presence of scratches or foreign materials (e.g., hair, dust, etc.). In one embodiment, pixels of an image are analyzed and at least one or more of the pixels may be labeled and identified as defective (e.g., pixels having image data corresponding to an artifact as opposed to the image) responsive to the analysis. Exemplary embodiments of the disclosure provide exemplary methods and apparatus for identifying defective pixels and reconstructing the pixels which have been identified as being defective.

Referring to FIG. 1, an exemplary imaging system 10 is shown according to one embodiment. The depicted imaging system 10 includes an image data generation device 12 and a display device 14. Image data generation device 12 may be embodied in any appropriate implementation configured to generate image data (e.g., digital data including bytes of binary data in one embodiment) of one or more image. For example, image data generation device 12 may comprise a digital camera, scanner, and/or copier in exemplary possible embodiments. Display device 14 may comprise a personal computer, work station, portable electrical device (e.g., personal digital assistant, cellular telephone, etc.), projector, printer or any other structure configured to process, modify, display and/or depict image data.

Although the depicted exemplary embodiment of imaging system 10 is shown as comprising two separate entities 12, 14, for example having different respective housings, other configurations are possible. For example, in another embodiment of imaging system 10, both the image data generation device 12 and the display device 14 may be embodied within a single device and housing. In other possible implementations of system 10, a plurality of generation devices 12 and/or display devices 14 may be utilized.

Referring to FIG. 2, exemplary components of one embodiment of imaging system 10 are shown. The depicted exemplary embodiment includes a housing 16 which houses an image sensor 20, processing circuitry 22, storage circuitry 24, a display 26, and a communications interface 28. Although not shown, additional components (e.g., user input device, optics, lens, etc.) of devices 12, 14 of imaging system 10 may be provided in other embodiments. Also, in other embodiments, one or more of the depicted components may be illustrated outside of the housing 16 (e.g., provided in the housing of another device).

The illustrated components may be arranged in different configurations in different embodiments of imaging system 10. For example, in embodiments wherein devices 12, 14 are implemented as separate entities, one or more of the components (e.g., processing circuitry, storage, communications interface) may be implemented within both of the image data generation device 12 and the display device 14. In typical embodiments, image sensor 20 and display 26 are embodied in respective ones of devices 12, 14 although individual ones of the devices 12, 14 may include both an image sensor 20 and display 26 in other embodiments. In other embodiments wherein devices 12, 14 are implemented within the same entity, the components of FIG. 2 may be implemented within a common housing 16 as shown in at least one configuration.

Image sensor 20 is configured to provide image data of a plurality of images. In one embodiment, the image data comprises digital data corresponding to a plurality of pixels of images formed by image sensor 20. For example, image data may include bytes corresponding to one or more channel. In an exemplary RGB implementation, the channels may correspond to the colors of red, green and blue at respective pixels. Other embodiments may utilize or provide gray, luminance, Infra-Red, or other color information. Image sensor 20 may comprise a plurality of photosensitive elements in some embodiments, such as photodiodes, charge coupled devices (CCDs) or CMOS devices, corresponding to the pixels and configured to provide the image data. Other suitable implementations of image sensor 20 are possible.

In one embodiment, processing circuitry 22 may comprise circuitry configured to implement desired programming. For example, processing circuitry 22 may be implemented as a processor or other structure configured to execute executable instructions including, for example, software and/or firmware instructions. Other exemplary embodiments of processing circuitry include hardware logic, PGA, FPGA, ASIC, state machines, and/or other structures. These examples of processing circuitry 22 are for illustration and other configurations are possible.

Processing circuitry 22 may be configured to process image data generated by image sensor 20 or other source in exemplary embodiments. For example, processing circuitry 22 may be implemented to access image data in real time directly from an imaging pipeline of imaging system 10 after the generation of the image data. In other embodiments, processing circuitry 22 may access and process previously generated image data for example stored within storage circuitry 24. Processing circuitry 22 may be configured to access and process image data from any other location or appropriate device. Processing circuitry 22 may be implemented in different configurations in different embodiments of imaging system 10. For example, processing circuitry 22 may be implemented using a processor of image data generation device 12 (e.g., a controller of a scanner) or as a central processing unit of display device 14 implemented as a computer or a workstation in some embodiments. Other configurations may also be used wherein operations of processing circuitry 22 described herein are distributed between plural devices 12, 14 and/or other additional devices or processing circuits.

Storage circuitry 24 is configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information. In illustrative embodiments, storage circuitry 24 stores image data (e.g., buffers generated image data in real time and/or stores previously generated image data).

Display 26 is configured to generate visual images using the image data for observation by a user. Different configurations of display may be used corresponding to the implementation of imaging system 10 and/or display device 14. Any appropriate arrangement for depicting visual images may be used and exemplary configurations of display 26 include a cathode ray tube (CRT) device, flat panel display, projector, printer, etc.

Communications interface 28 is configured to implement communications internal to imaging system 10 (e.g., between respective devices 12, 14 in embodiments wherein devices 12, 14 comprise different entities). In addition, communications interface 28 may implement bi-directional communications of imaging system 10 with external devices. Exemplary configurations of communications interface 28 include a USB port, serial or parallel connection, IR interface, wireless interface, or any other arrangement capable of uni- or bi-directional communications. Any appropriate data including image data may be communicated using communications interface 28.

Referring to FIG. 3, an exemplary method for processing image data according to embodiments of the disclosure is shown. In one implementation, processing circuitry 22 is configured to perform the depicted method steps. Other methods are possible in other embodiments including more, less and/or alternative steps.

Initially, at a step S10, the processing circuitry is configured to access image data to be processed. For example, the image data may be accessed from storage circuitry.

At a step S12, the processing circuitry is configured to convert the image data from an initial representation or format to another representation or format for further processing. For example, in one embodiment, received image data comprises color information and the processing circuitry may convert the image data from a color representation to a gray representation of the image. This exemplary conversion may be utilized to reduce the amount of memory used for the processing without significant adverse effects. In other methods, the described conversion may be omitted. As described below according to one embodiment, the processing circuitry may also generate a detail-less image using the image data for use in identifying defective pixels. The gray representation and the detail-less images comprise different representations of the image and image data.

Exemplary conversions to a gray representation includes using image data from a luminance channel, using a green channel, or the product of three color channels (e.g., red, green, blue). One embodiment of using a luminance channel to convert to a gray representation includes converting according to the following formula wherein p._____ represents the colors of the respective pixels:

$$g = \text{floor}(p.\text{red}*0.299 - p.\text{green}*0.587 + p.\text{blue}*0.114)$$

Additional computation or memory allocation is not used when the green channel is utilized. Usage of the product channel enables improved detection of relatively light defects but may mask some defects which are relatively dark. Other conversions may be used.

At a step S14, processing circuitry performs pixel labeling operations upon the image data. Exemplary pixel labeling includes examination of the image pixel-by-pixel and individual ones of the pixels are identified as a candidate (i.e., defective) or a non-candidate (i.e., clean, acceptable or otherwise not comprising a defect). In one aspect, the processing circuitry searches for candidate pixels which are relatively much lighter or darker (e.g., for transmitive media such as slides or film an artifact may be dark while for reflective images such as printed on paper an artifact may be light) than neighboring pixels and accordingly indicative of an artifact. The output of step S14 may be a defect map which indicates the pixels of the image which are considered to be defective and which are clean. Additional details of an exemplary method for implementing step S14 are described below with reference to FIG. 4. Other pixel labeling embodiments are possible.

At a step S16, the processing circuitry performs regional classification operations upon the defect map. The region classification operations examine regions of the defect map and corresponding regions of the image to refine the process of identifying defective pixels. In one embodiment, the processing circuitry uses larger regional considerations of the image to refine the pixel labeling. More specifically, at least some pixel labeling embodiments identify high contrast defects. If the defect is sharp, then the contrast with the background may be sufficient to identify defective pixels. However, optics of some devices may blur the edges of a foreign object particularly at higher resolutions and the contrast may not be sufficient to identify defective pixels which may remain in the image. If a contour of a defect is not identified, then the defect may be reduced but otherwise remain in the image and be visually unacceptable or mislead subsequent reconstruction operations.

Accordingly, step S16 in one embodiment attempts to locate a defect contour by solving a classification problem. During processing at step S16, defective pixels may remain classified as defective. However, clean pixels located near defective ones may be relabeled as "don't know" and such pixels are subsequently classified as clean or defective based upon the intensity values of the pixel in the described embodiment. The distance used to determine which clean pixels are to be re-analyzed may be based upon the optical blur of the optics of the device which generated the image data. For example, a distance of 3 pixels may be used in some implementations.

An individual one of the pixels labeled "don't know" may be classified using local intensity information of pixels adjacent to the pixel in at least one embodiment. The adjacent pixels may be in a block or neighborhood about the pixel of interest. In one embodiment, a block of 3 pixels about the pixel of interest is used. There may be clean, defective and/or "don't know" pixels in the block. In one embodiment, the intensity of the "clean" and "defective" pixels is used to classify the "don't know" pixels using Quadratic Discriminant Analysis (QDA) (i.e., 1-dimensional classification). QDA classification assigns individual ones of the "don't know" pixels to the class to which it belongs with the highest likelihood. The classes may be assumed to have a Gaussian distribution and the classification may be implemented using means and variances in one implementation.

In this described regional classification, intensity information of the image data as well as geometric information (e.g., proximity to a defective pixel) may be used for the classification. Based upon the similarity of the intensity values between the pixel of interest to pixels labeled clean or defective, the pixel of interest is labeled as clean or defective. Utilization of this exemplary combination of information attains an appropriate balance between finding a low-contrast defect contour and preserving features. The above-described classification has advantages of relatively low computation time although other classification methods may be used in other embodiments.

At a step S18, the processing circuitry in one embodiment may perform heuristic activity filtering upon the defective pixels identified in step S16. For example, some images being processed may contain high activity texture which is similar to dust or scratches and accordingly many clean pixels may be inappropriately identified as defective. In one embodiment, the processing circuitry may implement filtering which disregards or ignores pixels which are identified as defective but exist in an area of an image which has a number of defects which exceeds a threshold. In one embodiment, filtering may be implemented in individual regions occupying 1/100 of the image. In one specific implementation, pixels previously labeled as defective may be disregarded if the number of pixels labeled as defective exceeds the square root of the area of the respective region. In other embodiments, other detection density thresholds (v) may be chosen to implement other desired levels of filtering. Accordingly, in at least one embodiment, individual ones of the pixels which have been labeled as defective may not be indicated as defective as a result of other proximate pixels of the image being identified as defective. The exemplary described filtering is relatively computationally efficient and may improve the results for images with relatively high activity. The output of step S18 identifies defective pixels of the image in one arrangement.

At a step S20, the processing circuitry accesses the list of defective pixels and implements reconstruction operations of the defective pixels. In one reconstruction embodiment, the processing circuitry replaces the original image data of the pixel with reconstructed or replacement image data. Exemplary reconstruction methods are described below with respect to the embodiments of FIGS. 5 and 6.

Following the reconstruction, the revised images including the reconstructed data may be stored, displayed for a user and/or printed.

Referring to FIG. 4, an exemplary method of the pixel labeling S14 is shown. In one implementation, processing circuitry 22 is configured to perform the depicted method steps. Processing circuitry 22 implementing FIG. 4 may generate and output a defect map using the data converted (e.g., gray representation data) in step S12 in one embodiment. Other methods are possible in other embodiments including more, less and/or alternative steps.

In one pixel labeling embodiment, the processing circuitry searches for pixels which are relatively much more lighter or darker than neighboring pixels and may be suspected to be parts of defects. Initially, the processing circuitry may create a detail-less image, for example, by applying a median filter to the data. The size of the median filter is a parameter indicating the size of the defect. In one example, a median filter may be applied to a gray image by defining a neighborhood or block of pixels (e.g., 5×5) about the pixel of interest and the output is the median value of all pixels in the block.

In one embodiment, the processing uses pixel labeling methods to erase defects while maintaining evidence of image features such as edges and texture. Exemplary pixel labeling methods use morphological operations or median filtering.

As described further below, the processing circuitry may use the gray representation of the image and the detail-less image to compute two measures at each pixel being analyzed and including gray-level difference and contrast dis-similarity. Each of the measures indicates how likely the pixel is to be defective. In one embodiment, the measures may be calculated in a relatively fast and simple manner. In other embodiments, one of the measures may be utilized alone to determine how likely a pixel is to be defective.

At a step S30, the processing circuitry accesses converted data which may be a gray representation of the data and the detail-less image according to one embodiment. The processing circuitry then determines the gray level difference which, in one embodiment, is a pixel-by-pixel difference between the gray image and the median filtered image. In the described embodiment, the defect type (light versus dark) determines the order between subtraction operands and pixels having relatively high values (e.g., 30) in the gray-level difference measure are generally defective. Also, image edges and small edges in textured areas have high values.

At a step S32, the processing circuitry determines the contrast dis-similarity which may also be referred to as a contrast difference measure. The purpose of this measure is to exclude edges and texture edges that have high values in the gray-level difference measure inasmuch as image edges, unlike defects, are still evident in the detail-less image. The size of the blocks of the median filter may be of sufficient size to erase defects. While pixel values along an edge may be changed by a filtering process, the contrast in the region around each pixel remains relatively high even in the detail-less image. When defects are erased in a detail-less image, however, the contrast is relatively high in the original image, but low in the detail-less image.

In one embodiment, processing circuitry uses plural representations of the image (e.g., gray and detail-less) to determine contrast difference. The local contrast difference between the gray image and the detail-less image at a pixel i may be determined as follows:
1. Let $\sigma_i^g$ be the standard deviation of the pixel values in a D×D neighborhood of pixel i in the gray image.
2. Let $\sigma_i^{dl}$ be the standard deviation of the pixel values in a D×D neighborhood of pixel i in the detail-less image.
3. The contrast difference at location i may be defined as:

$$1 - \frac{2\sigma_i^g \sigma_i^{dl} + C}{(\sigma_i^g)^2 + (\sigma_i^{dl})^2 + C}$$

where C is a constant used to avoid division by 0 and D is a dimension of a defect (e.g., assumed defect one-dimensional size, such as width, in an integral number of pixels).

As shown in one embodiment, the processing circuitry identifies a group of pixels within the D×D neighborhood and calculates plural standard deviation values using the different representations of the image data. The standard deviation values may be used to determine the contrast difference in one embodiment.

This measure is more coarse than the gray-level difference measure because it is computed upon blocks. The contrast difference is high at defects and low at edges and texture edges.

At a step S34, the processing circuitry combines the above-determined measures in order to label individual pixels as defective or not in one embodiment. Both of the above-described measures are relatively high at defects and the processing circuitry may threshold the measures in one embodiment to locate the defective pixels. The measures may be combined in such a manner that each measure is treated as a "probability" of defect. In one embodiment, pixels which have both relatively high gray-level difference and high contrast dis-similarity are labeled as defects. For an individual pixel being analyzed, the results of each measure may be multiplied by each other to provide a single measure or value which may be compared with a detection threshold and the pixel may be labeled as defective if the value exceeds the threshold. The detection threshold may be an input parameter in one embodiment (e.g., 20. 0.5).

In another embodiment, the processing circuitry may threshold each measure and use logical operations such as AND or OR to combine the values of each measure. Other arrangements are possible for labeling a pixel as defective.

At a step S36, the output of the combination of the measures is a defect map in one embodiment which indicates which pixels of the image are defective. The above-described detection algorithm is performed on individual ones of the pixels and may use small support (i.e., local context is used to determine whether a pixel is defective) in the described embodiment.

Figure 6:
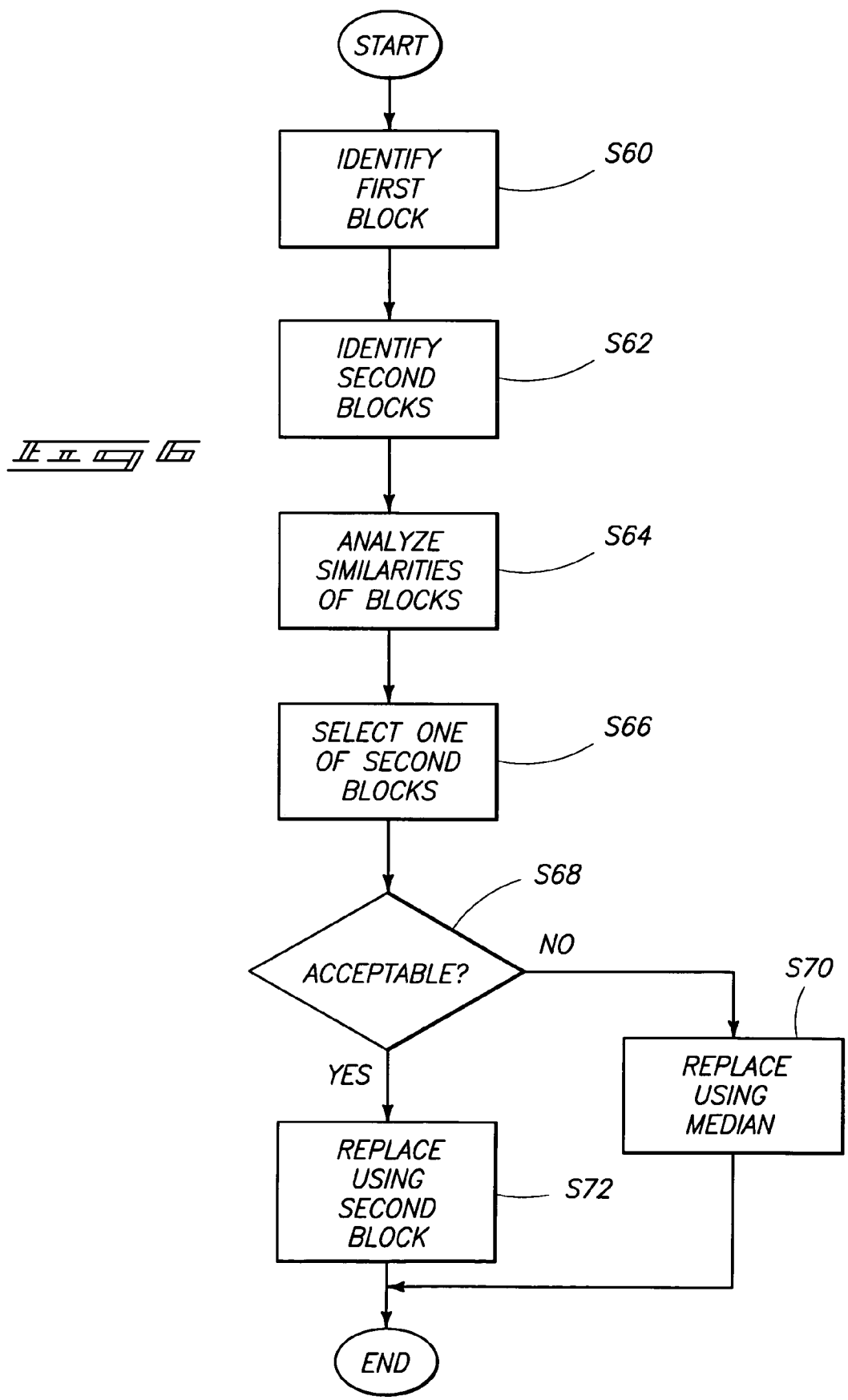
FIG. 6 is a flow chart of a method for reconstructing defective pixels according to one embodiment.

Referring to FIGS. 5 and 6, exemplary embodiments are illustrated for correcting defective pixels. In one implementation, processing circuitry 22 is configured to perform the steps of the illustrated methods. The illustrated methods may be performed upon the defective pixels and since the number of defective pixels is typically small, computationally more expensive methods may be used in some embodiments. The configurations of FIGS. 5 and 6 correspond to small and large support embodiments, respectively, wherein the method of FIG. 5 uses local context and the method of FIG. 6 uses large regions of an image. Other reconstruction embodiments are possible including more, less and/or alternative steps. For example, a median filter may be used as a default small support reconstruction method in one embodiment. Median reconstruction is computationally efficient but the results may be blurry and may be unacceptable for some implementations. Blurriness may be noticeable in cases of false detection where lines or spots originated in image features are replaced by smooth blocks which may result in breaking or erasing of corresponding features.

Referring to FIG. 5, an exemplary small support directional reconstruction method is illustrated as mentioned above. This exemplary method is a relatively fast algorithm which achieves improved image quality versus the utilization of a median filter. In general, the directional reconstruction processing of the embodiment of FIG. 5 attempts to determine whether there is a feature in a block with a given direction. For example, the method determines whether a dominant direction exists for a D×D block surrounding the defective pixel being analyzed and corrects the missing pixels to emphasize the existing direction. Image features which where mistakenly detected may be partially restored using the described method. If no definite direction is observed, the method may use an average of the pixel values of the block, use a median filter, or other option.

More specifically, at a step S40, the processing circuitry operates to identify a D×D block (e.g., 5×5, 9×9, etc.) of pixels about a defective pixel being analyzed.

At a step S42, the processing circuitry calculates a gradient at individual pixels of the block. An exemplary formula to calculate the gradient for a pixel Pij (and Vij is the value for the pixel) is:

Gradient=sqrt(($V_{i+1,j}-V_{ij}$)^2-($V_{ij}-V_{i,j+1}$)^2)

At a step S46, the processing circuitry estimates the reliability of gradient information for each pixel of the block. For example, gradients involving defective pixels are not reliable while gradients with small magnitudes may indicate noise as opposed to local directionality. Reliability is indicative of confidence that a pixel is defective or not based upon the identification, the gradient value itself and the value of the gradient itself as indicating direction.

If the calculated gradient information is unacceptable, the processing circuitry proceeds to step S48 to determine a median or average value of non-defective pixels to replace the defective pixel being analyzed.

If the calculated gradient information is acceptable, the processing circuitry proceeds to step S50 to calculate additional gradient information including an average gradient. In one embodiment, the processing circuitry computes a weighted average of the gradients in the block and may use reliability estimations as weight-measures.

At a step S52, it is determined whether the gradient information comprising the average gradient is sufficient. If the pixels involved in the average gradient computation are unreliable or the average gradient is small, the processing circuitry may proceed to step S48 to calculate the median or average value of non-defective pixels as the replacement data for the pixel.

If the average gradient is sufficient, the processing circuitry proceeds to a step S54 to determine the direction of the average gradient.

At a step S56, the processing circuitry identifies a line corresponding to the local edge in the block. The line is perpendicular to the direction of the average gradient. The processing circuitry further identifies another line parallel to and in the same direction as the local edge and which passes through the pixel of interest. The processing circuitry calculates an average value of non-defective pixels along the parallel line. The pixels located closer to the pixel of interest may be weighted higher than distant ones in one embodiment.

At a step S58, the processing circuitry associates replacement image data with the pixel being analyzed including replacing the image data of the pixel with replacement data including the average value calculated in step S56 or the median or average value calculated in step S48.

The processing circuitry may thereafter proceed to analyze other defective pixels of the pixel map.

As described above in one exemplary embodiment, the processing circuitry ignores defective pixels in the reconstruction computations of pixels. If the defect is located in a relatively homogenous area, then typically sufficient reliable data exists even if defective values are ignored. If the defect is located in a region of high activity, using data from previous computations may lead to propagation of error which may be visibly noticeable. In some embodiments, the data of defective pixels may be used and generally provides better results than the original data.

Previously synthesized data (e.g., reconstructed data generated for a given pixel) may be used in some embodiments to reconstruct image features. For example, false detection of long lines are reconstructed relatively well by directional reconstruction discussed above using synthesized data. In one embodiment, preservation of features may have a higher priority than removing defects and synthesized values may be used for reconstruction.

Referring to FIG. 6, an exemplary large support method is shown for implementing reconstruction of defective pixels. For the described exemplary method, D (defect dimension) and R (regional dimension) are positive integers such that D<R and a defective pixel being analyzed may be labeled i.

At a step S60, the processing circuitry may identify a first block of pixels Ci. The first block Ci may be referred to as a context of the defective pixel i and includes the color channels of the pixels in a D×D neighborhood (e.g., 5×5, 7×7, 9×9, etc.) around the pixel i.

At a step S62, a plurality of second blocks may be identified. In one embodiment, the second blocks may correspond to all D×D neighborhoods Nj in an R×R region (e.g., 100× 100, 256×256, etc.) around pixel i. In the described exemplary implementation, neighborhoods with defective pixels are excluded from the search.

At a step S64, the processing circuitry identifies one of the second blocks of pixels which is most similar to the first block of pixels. In one embodiment, the sum of squared differences is calculated between non-defective pixels of the first block and the corresponding pixels of individual ones of the second blocks. The sum of the squared differences is indicative of the similarities of individual ones of the second blocks of pixels with respect to the first block of pixels.

At a step S66, the most similar or closest second block (e.g., having the lowest sum of squared differences) is selected.

At a step S68, it is determined whether the sum of the squared differences is below a pre-defined threshold.

If the analysis of step S68 is negative, the processing circuitry may proceed to step S70 to associate replacement data with the defective pixel replacing the image data of the defective pixel with replacement data including the median or average value of the D×D neighborhood in one embodiment.

If the analysis of step S68 is affirmative, the processing circuitry may proceed to a step S72 to associate replacement data with defective pixels including replacing plural defective pixels in the first block Ci using replacement data including the respective corresponding pixel values in the selected or identified second block Nj.

The method of FIG. 6 may be repeated for other defective pixels in one implementation.

Trade-offs exist using the methods of FIG. 5 or FIG. 6. The small support method of FIG. 5 is fast but may not be able to reconstruct complex textures. Also, the small support method may provide improved results where linear features are reconstructed. The large support method of FIG. 6 is slower but can also accommodate reconstruction of any given texture as long as it can be located in the image.

Exemplary methods described herein utilize parameters for providing dust and scratch removal operations and which affect final image quality. The parameters may be tailored differently depending upon the implementation and application of the method. Some parameters for reconstruction may typically remain consistent across different images, regardless of the origin of the image, its resolution or content. The size of D×D blocks may be image dependent and may be set to the same as a detection block size in one reconstruction embodiment. The parameters for detection of defective pixels may be dependent upon characteristics of the scanned images. Exemplary parameters for detection in a pipeline of a scanner embodiment are shown in one embodiment in Table A.

TABLE A

| Parameter | Range | Description |
| --- | --- | --- |
| Defect size (D) | [3 . . . 25] | The size of the defect in pixels. |
| Gray level difference threshold (t1) | [1 . . . 255] integer | Gray level detection threshold. |
| Contrast difference threshold (t2) | [0 . . . 1] real | Contrast difference detection threshold. |
| Detection density threshold (v) | {−1} ∪ [1 . . . 5] real | "volume" of detections allowed in a region for activity filtering. Less detections are ignored with higher numbers. To get the maximum number of detections −1 should be used. |

In general, the size of the defect may depend upon scan resolution in scanner implementations wherein higher scan resolution implies larger defect sizes. For high DPI values (e.g., 2400 and above on an HP Scanjet 3200), the scanner optics may blur the scanned image. This smoothing may interfere with detection which uses contrast of the artifact with its backgrounds. In one embodiment to overcome optical smoothing, images scanned higher than a given resolution may be down-sampled and detection may be applied on the down-sampled image using associated parameters. An additional advantage of detecting in a down-sampled image is improvement of memory utilization in the pipeline.

Other processing of images may also impact or improve exemplary dust and scratch removal operations discussed herein. For example, it is more straightforward to detect defects in images that have been sharpened. A sharpening algorithm of a scanner may remove optical blur and reduce the above-mentioned difficulties in high resolution embodiments. On the other hand, sharpening may sometimes overshoot leading to shadow areas on edges which when present in a detected region may mislead reconstruction processing causing unpredictable results.

In some embodiments, a user may specify the extent of the defect correction implemented from none increasing to low, medium or high. A low setting does not typically harm image features but may miss an increased number of defects. A medium setting typically removes a high proportion of dust with little effect on image details. A high removal setting typically removes all defects but also may impact some details. Other implementations are possible.

The protection sought is not to be limited to the disclosed embodiments, which are given by way of example only, but instead is to be limited only by the scope of the appended claims.

What is claimed is:

1. An imaging system comprising:
processing circuitry configured to access image data of a plurality of pixels of an image, to provide a plurality of representations of the image data, to determine contrast difference between the representations of the image data for a respective one of the pixels, to identify the one of the pixels as being defective using the determined contrast difference, and to provide replacement image data for the one of the pixels identified as defective and which is different than the accessed image data for the one of the pixels identified as defective.

2. The system of claim 1 wherein the processing circuitry is configured to provide the representations comprising a gray image and a detail-less image.

3. The system of claim 1 wherein the processing circuitry is configured to identify a group of pixels, to calculate plural standard deviation values using the different representations of the image data for the group of pixels, and to use the standard deviation values to determine the contrast difference.

4. The system of claim 1 wherein the processing circuitry is configured to determine a gray-level difference measure for the one of the pixels, and to use the gray-level difference measure and the contrast difference to identify the one of the pixels as being defective.

5. The system of claim 1 wherein the one of the pixels is identified as clean at one moment in time and the processing circuitry is configured to define a region comprising a plurality of additional pixels about the one of the pixels initially identified as clean and to utilize intensity information of the additional pixels and geometrical distance information of the additional pixels with respect to the one of the pixels identified as clean to label the one of the pixels as defective at another moment in time.

6. The system of claim 1 wherein the processing circuitry is configured to disregard the replacement image data as a result of others of the pixels being identified as defective.

7. The system of claim 1 wherein the processing circuitry comprises processing circuitry of an imaging device configured to generate the image data.

8. The system of claim 1 further comprising:
an interface; and
a housing configured to house the processing circuitry, and wherein the interface is configured to receive the image data from a source external of the housing.

9. An article of manufacture comprising:
media comprising programming configured to cause processing circuitry to perform processing comprising:
accessing image data of an image;
identifying at least one defective pixel;
identifying a first block of pixels of the image;
analyzing a plurality of second blocks of pixels of the image with respect to the first block of pixels;
using the analysis, selecting one of the second blocks of pixels as comprising replacement image data; and
associating the replacement image data with the at least one defective pixel.

10. The article of claim 9 wherein the media further comprises programming configured to cause processing circuitry to perform the analyzing comprising analyzing similarities of individual ones of the second blocks of pixels with respect to the first block of pixels.

11. The article of claim 10 wherein the selecting comprises selecting the one of the second blocks of pixels having the closest similarity to the first block of pixels.

12. The article of claim 10 wherein the analyzing comprises calculating a sum of squared differences between pixels of the first block of pixels and pixels of respective ones of the second blocks of pixels.

13. The article of claim 9 wherein the image data comprises an other defective pixel, and wherein the media further comprises programming configured to cause processing circuitry to perform processing comprising determining median image data using image data of the pixels of the first block and associating replacement image data comprising the median image data with the other defective pixel.

14. An imaging method comprising:
using processing circuitry, accessing image data of a plurality of pixels of an image;
using the processing circuitry, identifying whether one of the pixels of the image is defective comprising:
selecting the one of the pixels to be analyzed;
identifying a group of other pixels of the image;
determining standard deviation information of the other pixels; and
using the standard deviation information, indicating whether the selected one of the pixels is defective;
wherein the indicating comprises indicating that the selected one of the pixels is defective, and further comprising disregarding the indicating as a result of identifying a plurality of the pixels as defective.

15. The method of claim 14 wherein the image data of the at least one defective pixel is not indicative of content of the image.

16. The method of claim 14 further comprising providing plural representations of the image data of the group of other pixels, and wherein the determining comprises determining the standard deviation information for individual ones of the plural representations to provide contrast difference information, and wherein the indicating comprises indicating using the contrast difference information.

17. The method of claim 16 wherein the providing plural representations comprises providing a gray image representation and a detail-less image representation.

18. The method of claim 14 further comprising:
providing plural representations of the group of other pixels comprising a gray image representation and a detail-less image representation; and
comparing the gray image representation and the detail-less image representation providing a gray-level difference measure; and
wherein the indicating comprises indicating using the gray-level difference measure.

19. The method of claim 14 wherein the disregarding comprises disregarding as a result of a number of the pixels identified as defective within a region exceeding a threshold.

20. The method of claim 14 further comprising:
providing an other representation of the image data of the group of other pixels;
determining a gray-level difference measure using the other representation; and
wherein the indicating comprises indicating using the gray-level difference measure.

21. The method of claim 14 further comprising, after the disregarding, generating visual images for observation by a user using the image data.

22. The method of claim 14 further comprising storing the image data using storage circuitry after the disregarding.

23. An imaging method comprising:
using processing circuitry, accessing image data of a plurality of pixels of an image, wherein at least one of the pixels is identified as being defective; and
using the processing circuitry, reconstructing the at least one defective pixel comprising:
identifying a first block of pixels;
analyzing a plurality of second blocks of pixels with respect to the first block of pixels;
using the analysis, selecting one of the second blocks of pixels as comprising replacement image data; and
associating the replacement image data with the at least one defective pixel.

24. The method of claim 23 wherein the associating further comprises associating the replacement image data with another defective pixel.

25. The method of claim 23 wherein the analyzing comprises calculating a sum of the squared differences of individual ones of the second blocks of pixels with respect to the first block of pixels and selecting the one of the second block of pixels having the lowest sum of the squared differences.

26. The method of claim 23 wherein the analyzing comprises analyzing similarities of individual ones of the second blocks of pixels with respect to the first block of pixels.

27. The method of claim 26 wherein the selecting comprises selecting the one of the second blocks of pixels having the closest similarity to the first block of pixels.

28. The method of claim 26 wherein the analyzing comprises calculating a sum of squared differences between respective pixels of the first and the second blocks.

29. The method of claim 23 further comprising reconstructing another defective pixel of the image using a median value of image data of a plurality of the pixels of the image.

30. The method of claim 23 further comprising, after the reconstructing, generating visual images for observation by a user using the image data.

31. The method of claim 23 further comprising storing the image data using storage circuitry after the reconstructing.

32. An imaging method comprising:
using processing circuitry, accessing image data of a plurality of pixels of an image;
using the processing circuitry, identifying at least one of the pixels of the image as defective comprising:
selecting one of the pixels to be analyzed;
identifying a group of other pixels of the image;
providing plural representations of the image data of the group of other pixels;
determining standard deviation information of the other pixels comprising determining the standard deviation information for individual ones of the plural representations to provide contrast difference information; and
using the contrast difference information, indicating whether the selected one of the pixels is defective.

33. The method of claim 32 wherein the providing plural representations comprises providing a gray image representation and a detail-less image representation.

34. The method of claim 32 further comprising, after the identifying, generating visual images for observation by a user using the image data.

35. The method of claim 34 further comprising replacing the image data of the selected one of the pixels which is indicated to be defective before the displaying.

36. The method of claim 32 further comprising storing the image data using storage circuitry after the identifying.

37. An imaging method comprising:
using processing circuitry, accessing image data of a plurality of pixels of an image;
using the processing circuitry, identifying at least one of the pixels of the image as defective comprising:
selecting one of the pixels to be analyzed;
identifying a group of other pixels of the image;
providing plural representations of the group of other pixels comprising a gray image representation and a detail-less image representation;
determining standard deviation information of the other pixels;
comparing the gray image representation and the detail-less image representation providing a gray-level difference measure; and
using the standard deviation information and the gray-level difference measure, indicating whether the selected one of the pixels is defective.

38. The method of claim 37 further comprising, after the identifying, generating visual images for observation by a user using the image data.

39. The method of claim 38 further comprising replacing the image data of the selected one of the pixels which is indicated to be defective before the displaying.

* * * * *